(12) United States Patent
Neu

(10) Patent No.: US 6,401,753 B2
(45) Date of Patent: Jun. 11, 2002

(54) SHUT-OFF VALVE

(75) Inventor: Kunibert Neu, Albstrasse (DE)

(73) Assignee: Siemens Building Technologies AG (CH)

(*) Notice: Subject to any disclaimer, the term of this patent is extended or adjusted under 35 U.S.C. 154(b) by 0 days.

(21) Appl. No.: 09/804,970

(22) Filed: Mar. 13, 2001

(30) Foreign Application Priority Data

Apr. 3, 2000 (CH) .............................................. 0639/00

(51) Int. Cl.$^7$ ................................................. F16K 1/44
(52) U.S. Cl. ..................................... 137/625.36; 251/77
(58) Field of Search ....................... 137/625.35, 625.36; 251/77

(56) References Cited

U.S. PATENT DOCUMENTS

| | | | | |
|---|---|---|---|---|
| 1,839,710 A | * | 1/1932 | Smoot | 137/625.36 |
| 2,243,863 A | * | 6/1941 | Hoy | 137/625.36 |
| 2,682,891 A | | 6/1954 | Leslie et al. | |

FOREIGN PATENT DOCUMENTS

| | | |
|---|---|---|
| DE | 1 057 408 | 10/1959 |
| DE | 1 675 575 | 12/1970 |
| DE | 2 250 477 | 5/1974 |
| DE | 31 46 590 A1 | 6/1983 |
| DE | 3146590 | 6/1983 |
| DE | 0 645 562 A1 | 3/1995 |
| DE | 43 37 703 C1 | 3/1995 |
| EP | 645562 | 3/1995 |

* cited by examiner

*Primary Examiner*—John Fox
(74) *Attorney, Agent, or Firm*—Greer, Burns & Crain, Ltd

(57) ABSTRACT

The invention describes a shut-off valve having a double seat with an upper valve seat (7) of a diameter D1 and a lower valve seat (8) of a diameter D2 different to the diameter D1 (D1<D2), and a double-head setting member (12, 11, 10, 14) which in the closed condition prevents passage therethrough of a medium which is to be sealed off. The annular surface (D2–D1) of the double-head setting member (12, 11, 10, 14), which is acted upon by the medium to be sealed off and affords a closing force, and is formed from the outside diameter D2 and the inside diameter D1, is divided by a diameter D3 (D1<D3<D2) into at least two regions (10, 14) in order to distribute the closing force to the upper valve seat (7) and the lower valve seat (8).

9 Claims, 6 Drawing Sheets

SHUT-OFF VALVE

BACKGROUND OF THE INVENTION

1. Field of the Invention

The present invention concerns a shut-off valve having a double seat.

2. Description of the Prior Art

Double-seat valves are known for example from DE 31 46 590 and EP 0 645 562. DE 31 46 590 describes double-seat valves in which the inside diameters of the valve seats differ by a relatively great amount. As a result, when a pressure obtains between the valve heads, the opening force of the upper valve head which is of a larger inside diameter is greater than the closing force at the lower valve head.

Specifically for use as automatic shut-off valves for gas burners and gas appliances, the standard which applies in relation thereto is DIN EN 161 which establishes test criteria for approval for such valves. In regard to the definition of the classes of valves, it takes account of the double-seat valve in that the standard concerns a valve in class A, B or C if the sealing force is not reduced by the action of the intake pressure of the gas. By virtue of that definition, there are valves in the same class, with a differing shut-off characteristic in relation to a rising intake pressure. If a disc-type valve, for example in class B, can be subjected to the action of pressure until any component involved in the test fails, then in the case of double-seat valves in accordance with the standard, sealing integrity is no longer demanded after the maximum test pressure specific to the valve is exceeded. The reason for this is that the sealing force is essentially produced by the closing spring force and a component which assists the closing force, arising out of a possible differential area between large and small seat diameters, cannot be converted to the same extent into a rise in shut-off pressure against both seats, in the known structures. Added to that is the fact that the force which obtains at the differential area has to be overcome, when opening the valve. Specifically in the case of solenoid actuating units therefore the differential area is kept as small as possible, which minimises the proportion of the dynamic pressing force in terms of the static spring biasing force.

Besides the purely static pressure loadings, valves are also exposed to dynamic pressures which arise upon closure of the valves and which occur in particular at relatively high flow speeds and which can exceed 1.5 times the maximum operating pressure. A valve is also exposed to higher intake pressures if an upstream-connected high-pressure regulator exceeds its set outlet pressure.

SUMMARY OF THE INVENTION

The object of the present invention is to provide a shut-off valve having a double seat, which effectively prevents gas from passing through the shut-off valve, up to the specified bursting pressure of the valve.

In accordance with the invention, there is provided a shut-off valve having a double seat with an upper valve seat of a diameter D1 and a lower valve seat of a diameter D2 different to the diameter D1 (D1<D2), and a double-head setting member which in the closed condition prevents passage therethrough of a medium which is to be sealed off, wherein the annular surface (D2−D1) of the double-head setting member, which is acted upon by the medium to be sealed off and affords a closing force, and is formed from the outside diameter D2 and the inside diameter D1, is divided by a diameter D3 (D1<D3<D2) into at least two regions in order to distribute the closing force to the upper valve seat and the lower valve seat.

Therefore the core of the invention is that there is provided a defined differential area as an operative surface for the intake pressure, which is divided into sections which are resiliently and pressure-tightly connected together and directly or indirectly transmit the respective sealing force components to the large or small valve seat diameter respectively, wherein the closing spring forces which must satisfy the counter-pressure test in accordance with DIN EN 161 act separately on both seats and thus produce the initial shut-off pressure.

In comparison with single-head valves, double-seat valves admittedly suffer from the disadvantage of requiring more individual parts and a higher level of production accuracy, but in regard to the opening energy to be applied and the required volume for installation of the valve, they have major advantages, in comparison with single-head valves with the same through-flow, in terms of lower weight and a lower level of power consumption, for which reasons this type of valve will also assert itself in the future. The mean seat diameter in the case of the double-seat valve is only 70% of the seat diameter in the case of the single-seat valve and also the stroke movement which is so important for optimisation of solenoid drive units is also reduced to 70% in the double-head valve.

Due to the force equalisation effect arising out of the oppositely disposed surfaces which are subjected to the action of pressure, which forms the basis for the design configuration of the double-head valve, the pressure-loaded surface which is relevant for the opening pressure is reduced, in comparison with the single-head valve, to a circular ring as the difference between the large and small seat surfaces, whereby large reductions in regard to the opening forces are achieved, particularly in the case of valves with a relatively high admissible operating pressure and relatively large nominal widths.

Further advantageous configurations of the invention are set forth in the dependent claims.

BRIEF DESCRIPTION OF THE DRAWINGS

Some preferred embodiments of the apparatus according to the invention and the method according to the invention are described in greater detail with reference to the accompanying drawings in which.

DESCRIPTION OF THE PREFERRED EMBODIMENTS

Figure 1:
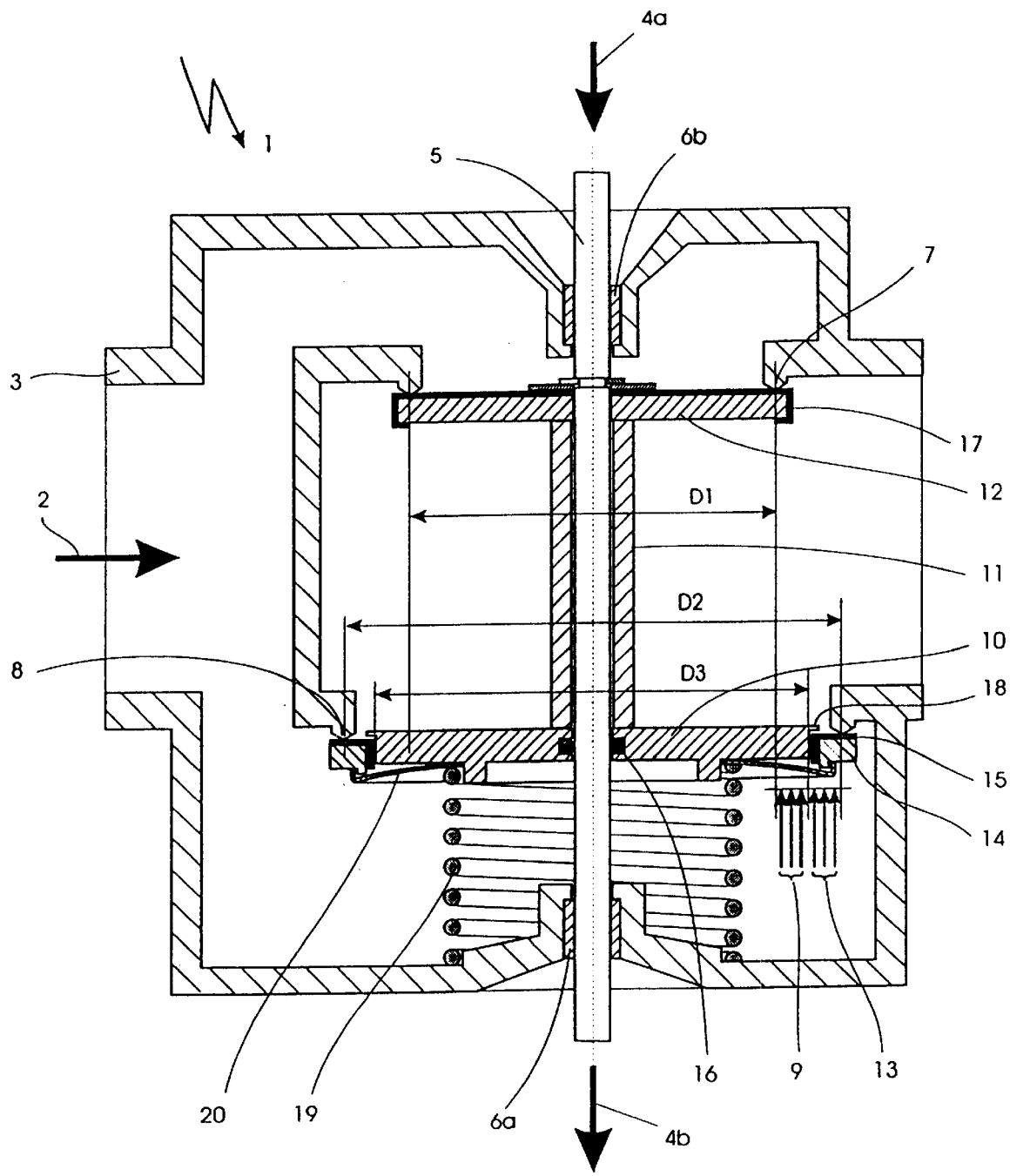
FIG. 1 is a diagrammatic view in longitudinal section of a shut-off valve.
Figure 1:
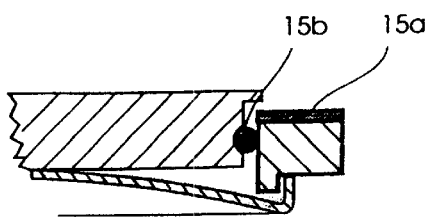

FIG. 1 shows a view in longitudinal section through a shut-off valve 1 through which flows a medium to be shut off, in the direction indicated by the arrow 2. For the sake of simplicity, subdivision of the valve housing 3 into individual components has not been illustrated in the drawing. The stroke actuating units for opening the valve are also not shown. As a substitute in that respect, the arrow 4a is intended to symbolically represent the mounting side for a pushing or thrusting actuating unit and the arrow 4b is intended to symbolically represent the mounting side for the pulling actuating unit. The rod 5 is guided through two bushes 6a and 6b which, depending on the respective actuator structure, are also combined with a rod seal, so that radial freedom of movement of the actuating or setting member is very substantially avoided. Optionally the rod end which is remote from the actuating unit may also be supported in the valve housing so that a rod seal is not required.

The two valve seats 7 and 8 are machined in the housing concentrically and in perpendicular relationship to the rod axis. Due to the tool used, the spacing thereof generally entails a high level of accuracy which is in the range of hundredths of a millimetre. In spite of that degree of precision in terms of the spacing between the seats and by calibration of the spacing of the two rubber sealing surfaces on the double-head setting member, it has not been possible in the previous double-head setting members to distribute the dynamic sealing force which builds up with a rising intake pressure to both valve seats. The consequence of this is that, as from a given pressure, one of the two seats begins to leak.

In accordance with the invention, that is to be avoided by means of the setting member structure shown in FIG. 1, in that the annular surface which is acted upon by the intake pressure and which provides a closing force, formed from the outside diameter D2 and the inside diameter D1, is divided into two regions by the diameter D3. The inner circular ring which is illustrated by the arrows 9 for the intake pressure loading is part of the large head 10 which is force-lockingly connected to the small head 12 by way of the spacer tube 11, thus affording a shut-off pressure formation effect at the valve seat 7, which is dependent on the intake pressure.

The arrows 13 which characterise the intake pressure on the outer circular ring, formed from D2 and D3, produce the pressure-dependent sealing force on the valve seat 8. The annular surface D2/D3 is part of the head ring 14 which on the one hand performs an axial sealing function with respect to the valve seat and on the other hand a radial sealing function at the diameter D3, with respect to the large head 10. As shown therefore the head ring 14 carries an elastomer 15 as the sealing material. The large head 10 is sealed off by an O-ring 16 with respect to the rod 5 to prevent a flow of medium therethrough.

The small head 12 carries an elastomer sealing material 17 which seals off in relation to the valve seat 7 and the rod 5.

The axial position of the head ring 14 relative to the large head 10 is essentially determined by the tolerances, which act in the direction of the stroke movement, of the components 12, 17, 11, and to the slightest extent by the tolerance of the seat spacing in the housing. When the setting member is opened the shoulder 18 on the large head entrains the head ring 14 including the seal 15 after a short lead motion.

In accordance with the above-indicated standard, a valve for gas burners, in a counter-pressure test with the respective pressure, must remain within predetermined leakage rates. Those test pressures are applied to the same annular surface, only on the outlet pressure side of the large head 10 and the head ring 14.

A sealing action in regard to that counter-pressure loading which would lift the setting member away from the seats can only be achieved by applying a correspondingly high shut-off pressure to the valve seats. That is achieved by virtue of the fact that a force component of the closing spring 19 is transmitted by way of the large head 10 and the spacer tube to the small head 12 and the other force component is transmitted by way of a diaphragm spring 20 to the head ring 14.

If for example a thrust actuating unit has to be reset with the closing spring 19, the closing spring force must provide that resetting energy and consequently must be stronger than the diaphragm spring 20 which only has to satisfy the demands of the counter-pressure test.

If the actuating unit is a solenoid the pure pressure force component on the circular ring D2/D1 is reduced for a maximum test pressure of 150 mbar.

After the test pressure is removed the closing spring forces which are determined only in accordance with the demands of the counter-pressure test produce a defined shut-off pressure on the valve seat surfaces 7 and 8.

If intake pressure is applied to the double-head setting member, then the shut-off pressure produced by the closing springs increases by a multiple of the intake pressure. That amplification factor is formed by the ratio of the respective part-annular area D2/D3 or D3/D1 respectively to the contact area of the sealing material on the valve seats 7 and 8. If for example the valve seat knife edge b is assumed to be 0.5 mm in width and the width of the two part-circular rings is set at 2 mm, that gives an amplification factor of around 4. In other words, from a 1 mbar intake pressure, 4 mbars shut-off pressure is produced, which means that a double-head setting member of that kind affords increasing sealing integrity just like a single-head valve with an increasing intake pressure, until its strength limit is reached.

In contrast to the single-head valve in which the amplification factor is calculated by D/(4b) and the valve seat width is set to be as small as possible in order to minimise the closing spring force in order to minimise the magnetic force, in the case of the double-head setting member according to the invention the annular area is to be reduced selectively without the free valve cross-section. For comparison purposes: For D=50 mm and b=0.5 mm, in the case of the single-head valve the amplification factor is 25. With high intake pressures however that amplification factor also results in high partial loadings in regard to the elastomer of the seal. By adapting the annular area to the pressure level, the double-head setting member according to the invention provides that the maximum pressing effect in the sealing material can be reduced to a high degree.

Figure 2:
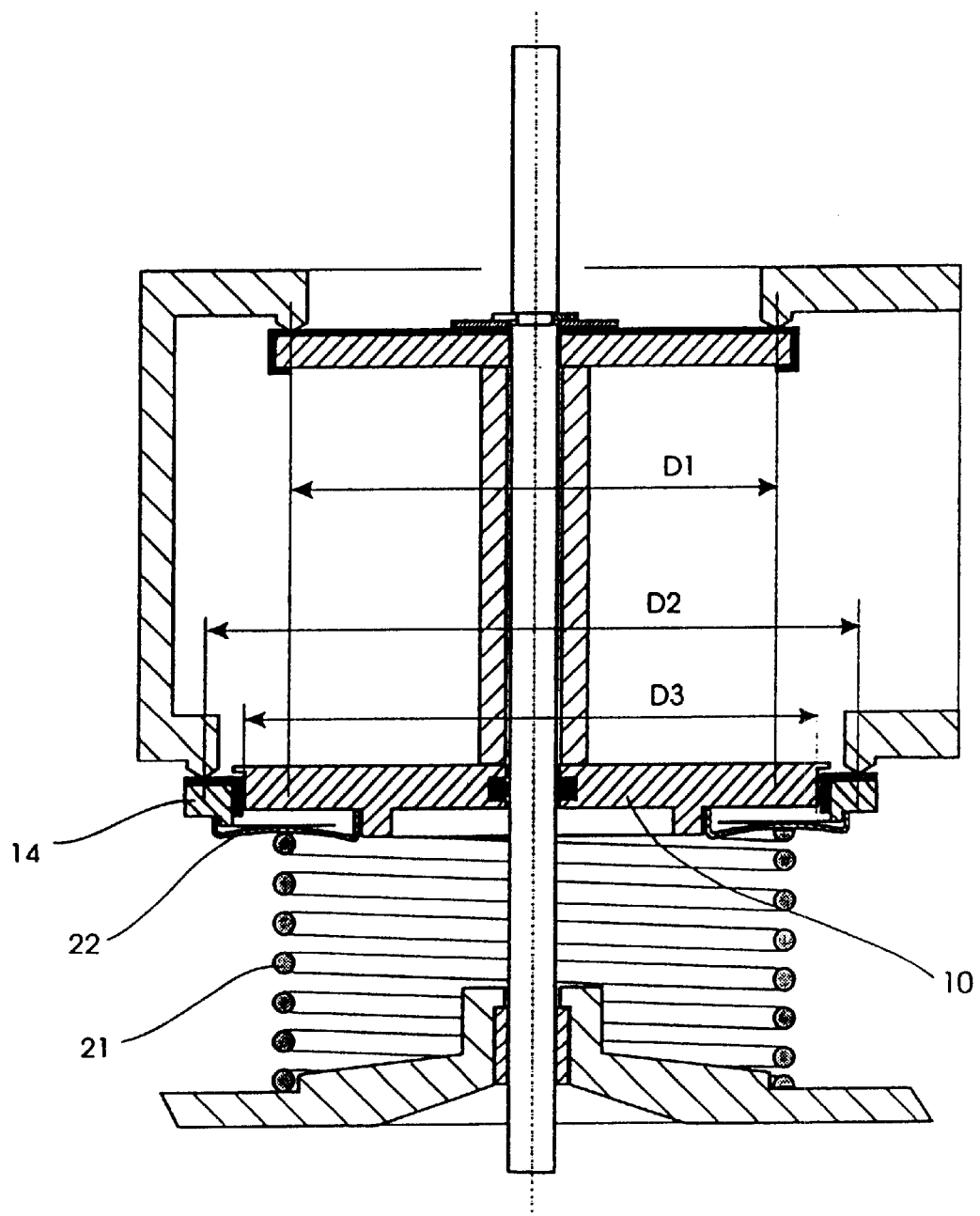
FIG. 2 shows a further embodiment of the double-head setting member with a closing spring.

FIG. 2 shows another way of distributing the forces involved, which involves installing only the closing spring 21 which transmits its force by way of a rocking member 22 to the large head 10 and the head ring 14 either in equal parts or in a predetermined ratio.

Figure 3:
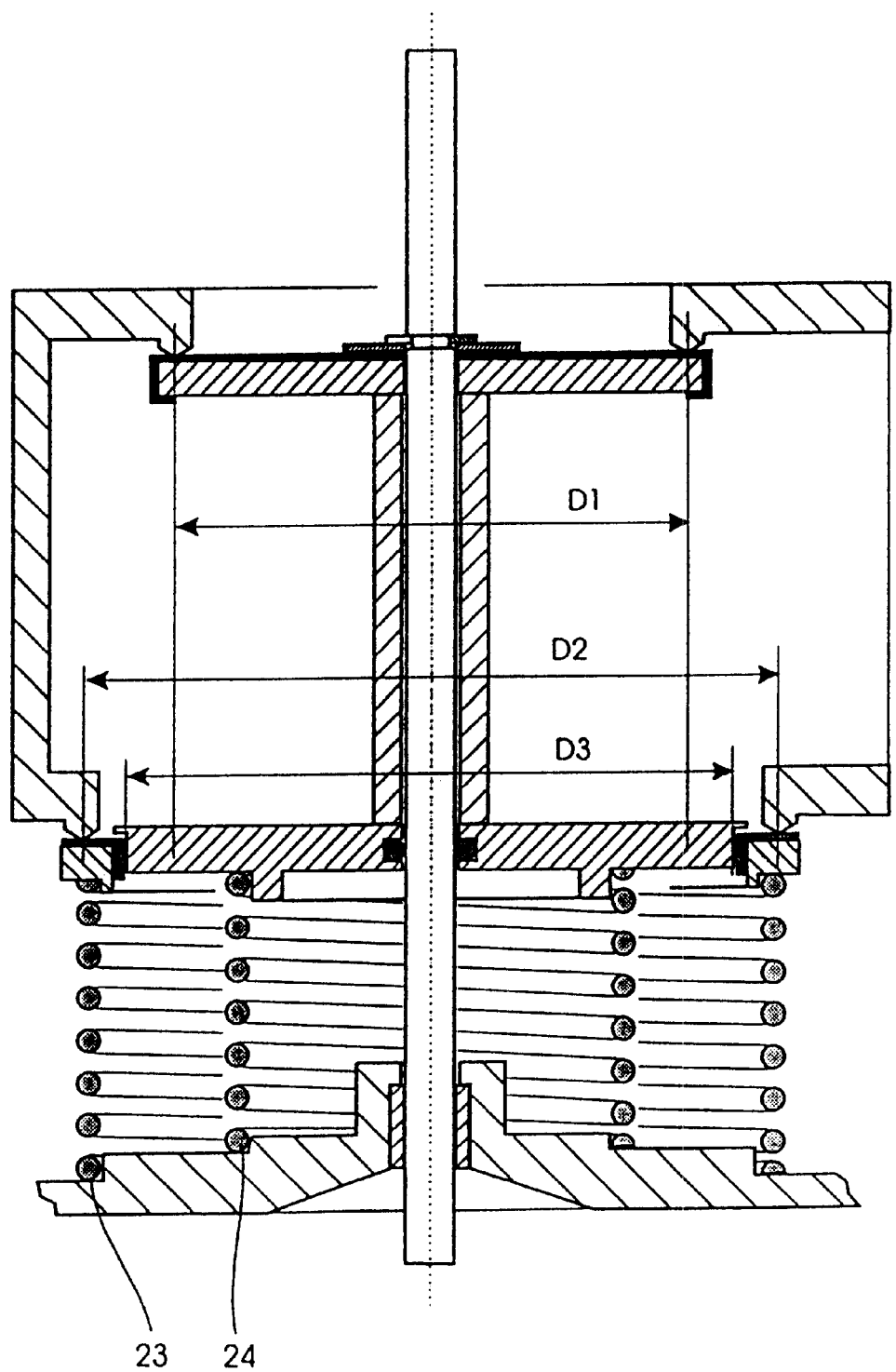
FIG. 3 shows a further embodiment of the double-head setting member with a modified closing spring.

FIG. 3 shows a further advantageous configuration which is distinguished in particular by simple implementation and adaptation of the spring forces. The closing spring forces associated with the class of valve can be associated separately with the large valve seat 7 by way of the head ring 14 and also the small valve seat 8 by way of the large head 10. The incorporation of two separate closing springs 23 and 24 affords an additional safety-relevant advantage for this design configuration of the double-head setting member.

Figure 4:
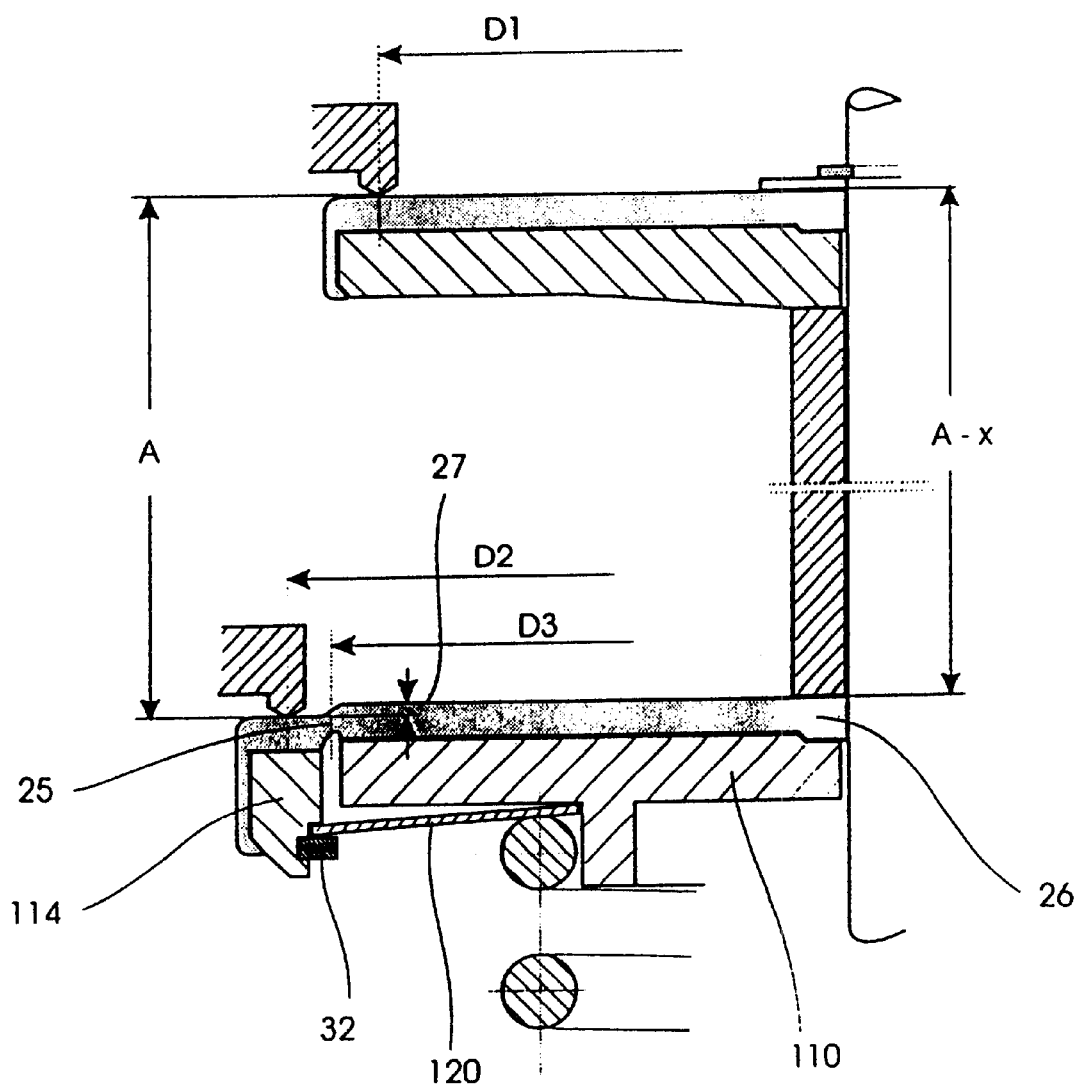
FIG. 4 shows a further advantageous embodiment of the double-head setting member.

FIG. 4 shows an advantageous embodiment of the double-head setting member by virtue of the resilient connection 25 of the large head 110 to the head ring 114, insofar as the sealing material 26 which is vulcanised in position both seals with respect to the valve seat 7 and the rod 5 and also makes a sealing and tolerance-compensating movable connection between the head ring 114 and the large head 110. The diaphragm spring 120, in the form of a flat apertured disc, is pressed against the large head by the closing spring and is connected in positively locking relationship to the head ring and is held axially by way of a securing ring 32, wherein after lifting away from the valve seat 7 the head ring 114 assumes a position which is always the same in relation to the large head. FIG. 4 shows the closed position of the setting member. The prestressed diaphragm spring 120 produces the required pressing force in respect of the sealing material in the region of the valve seat in order to satisfy the demands of the corresponding counter-pressure test of the standard. The excess stroke movement 27 provided for the large head takes account of the tolerance, described in the opening part of this specification, in terms of the individual parts of the setting member in the stroke direction.

Figure 5:
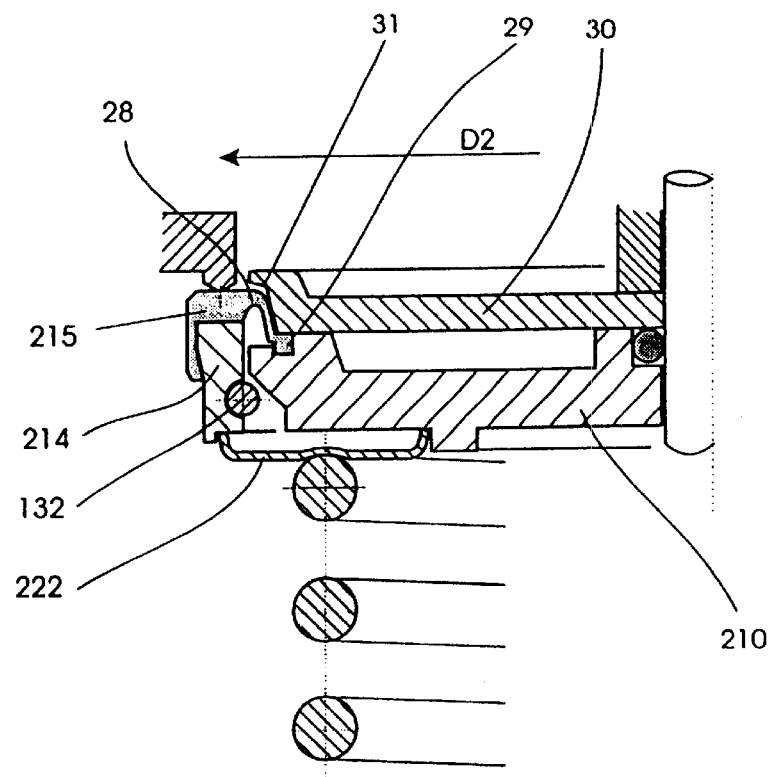
FIG. 5 shows a further advantageous embodiment of the large head of the double-head setting member.

FIG. 5 shows a further advantageous embodiment of the large head and the head ring in such a way that only the head ring 214 carries the sealing material which in particular is vulcanised in position and which is shaped radially inwardly to form a rolling diaphragm 28 and is sealed at the intake pressure side in the large head 210 by way of a sealing bead 29 which is prestressed by the cover 30. The cover 30 has an outside contour 31 in which the flexing zone of the rolling diaphragm can be supported when a high pressure loading is involved, in order to avoid overloading of the sealing material. A securing ring 132 limits the axial stroke movement of the rocker member 222 relative to the large head in the opened condition and thus also serves for entrainment purposes when opening the double-setting member. The head ring has a trailing movement when opening and a leading movement when closing.

Figure 6:
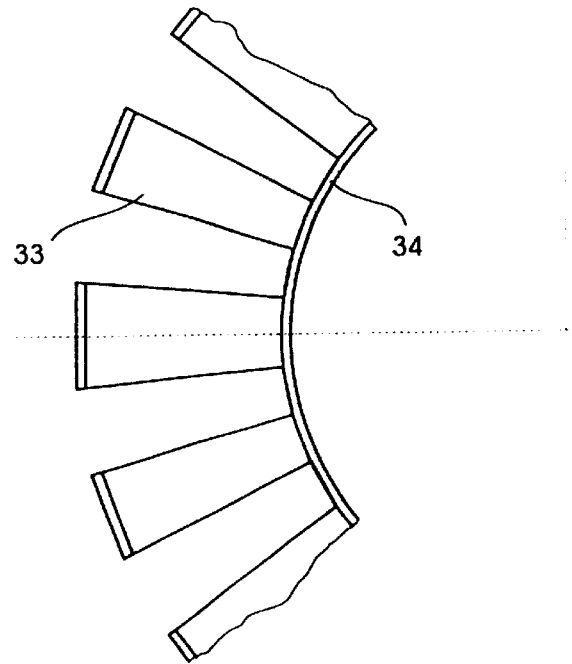
FIG. 6 shows a plan view of part of the rocking ring shown in FIG. 5.

FIG. 6 shows a plan view of part of the rocking ring 22 or 222. It comprises a number of "beams on two supports" which are held together at the inside diameter 34 by a peripherally extending connection. By virtue of being divided into rocking segments 33, this arrangement ensures that the head ring 214 can easily tilt relative to the large head, without uniform distribution of the biasing force being lost.

Figure 7:
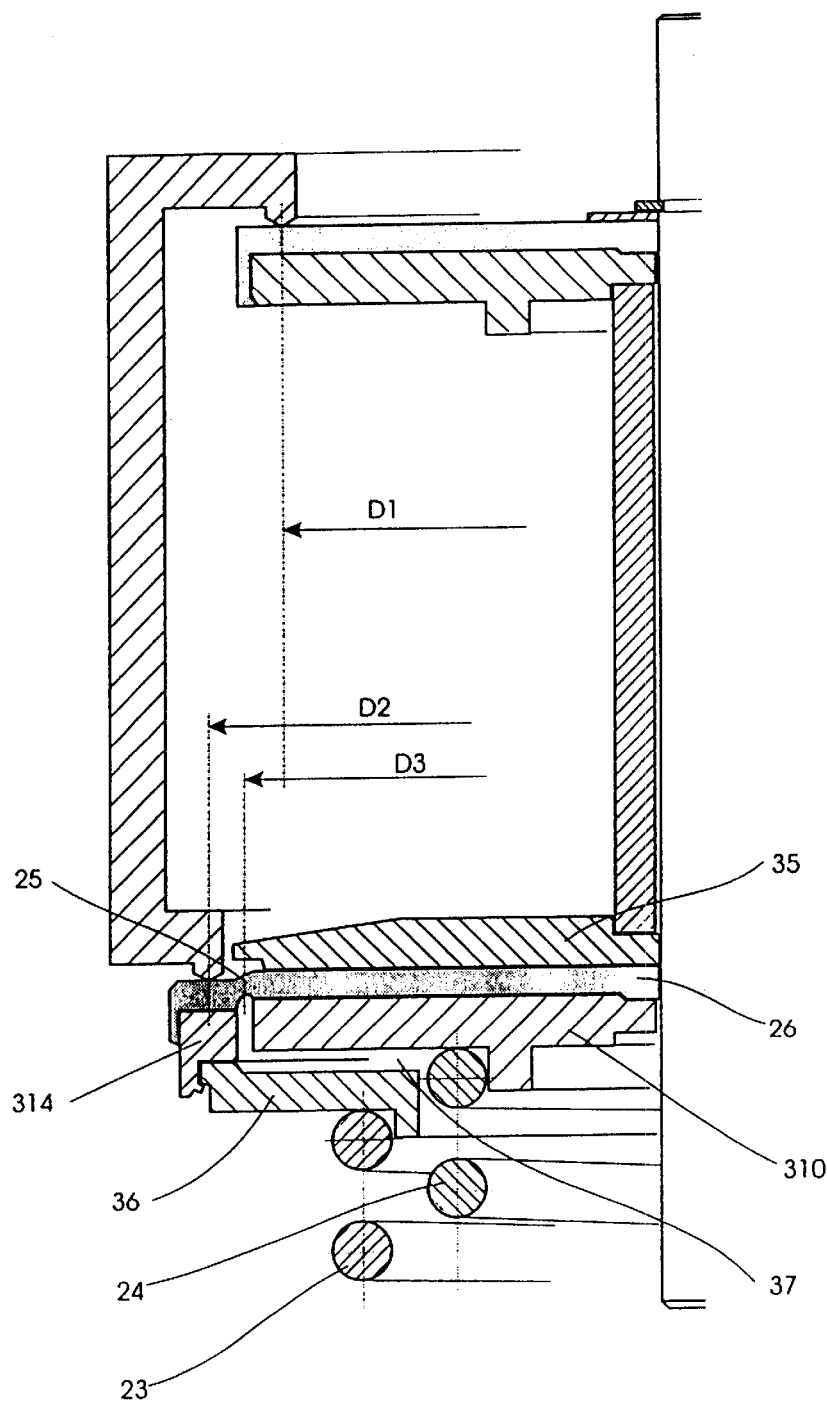
FIG. 7 shows a further advantageous embodiment of the double-head setting member.

FIG. 7 shows a further embodiment of the double-head setting member shown in FIGS. 3 and 4, in particular for higher intake pressures, by virtue of the installation of a disc 35 which has a support for the flexing zone 25 of the sealing material and which at the same time serves as a distributor plate for the closing force of the spring 24 in relation to the elastic sealing material 26 in order to minimise deformation in the longitudinal direction under an intake pressure loading. A spring disc 36 transmits the closing spring force to the head spring 314 which is connected to the spring disc in positively locking relationship, for example by flanging over. The positively locking engagement entrains the head ring in the opening movement against the intake pressure.

Figure 8:
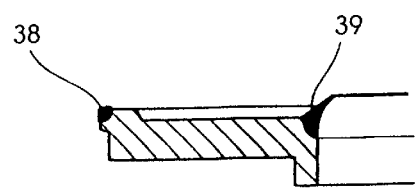
FIG. 8 shows a further embodiment of the setting member shown in FIG. 7.

FIG. 8 shows a development, in terms of safety, of the setting member shown in FIG. 7. As the spacing 37 between the spring disc 36 and the large head 310 is a few tenths of a millimetre, the spring disc 36 of FIG. 7 can be provided with a static seal 38 and a dynamically acting seal 39, which come into action in the case of a break in the flexing zone. The two seals are for example vulcanised in position and comprise a sealing material which is admissible for gases.

It will be appreciated that the invention is not limited to the embodiments described and illustrated.

I claim:

1. A shut-off valve having a double seat with an upper valve seat of a diameter D1 and a lower valve seat of a diameter D2 different to the diameter D1 (D1<D2), and a double-head setting member which in the closed condition prevents passage therethrough of a medium which is to be sealed off, wherein the annular surface (D2−D1) of the double-head setting member, which is acted upon by the medium to be sealed off and affords a closing force, and is formed from the outside diameter D2 and the inside diameter D1, is divided by a diameter D3 (D1<D3<D2) into at least two regions in order to distribute the closing force to the upper valve seat and the lower valve seat.

2. A shut-off valve according to claim 1, wherein the head of the double-head setting member which closes the lower valve seat comprises an inner head and a head ring which surrounds the inner head, in order to transmit the partial closing force acting on the inner head to the upper valve seat and the partial closing force acting on the head ring to the lower valve seat.

3. A shut-off valve according to claim 1, wherein a shut-off pressure of the double-head setting member is produced by a closing force which acts on the at least first region of the double-head setting member and a closing force is produced by way of means on the at least second region.

4. A shut-off valve according to claim 3, wherein the closing force of the at least first region is produced by a closing spring.

5. A shut-off valve according to claim 3, wherein the means for producing a closing force co-operates with the closing force of the at least first region.

6. A shut-off valve according to claim 3, wherein the means for producing a closing force is a closing spring.

7. A shut-off valve according to claim 5, wherein the closing force of the at least first region is transmitted by way of a diaphragm spring or a rocking member to the at least second region.

8. A shut-off valve according to claim 1, wherein the at least two regions are connected to a common sealing material.

9. A shut-off valve according to claim 8, wherein the flexing zone between the at least two regions is supported by means carried by the inner region.

* * * * *